(12) United States Patent
Gray et al.

(10) Patent No.: US 11,560,043 B2
(45) Date of Patent: Jan. 24, 2023

(54) PASSENGER CABIN AIR DISTRIBUTION SYSTEM AND METHOD OF USING

(71) Applicant: The Boeing Company, Chicago, IL (US)

(72) Inventors: John Charles Gray, Merritt Island, FL (US); Daniel Jay Menard, Gilbert, AZ (US); Mary Eileen Beckman, West Chester, PA (US)

(73) Assignee: The Boeing Company, Chicago, IL (US)

( * ) Notice: Subject to any disclaimer, the term of this patent is extended or adjusted under 35 U.S.C. 154(b) by 642 days.

(21) Appl. No.: 16/527,514

(22) Filed: Jul. 31, 2019

(65) Prior Publication Data

US 2021/0031595 A1 Feb. 4, 2021

(51) Int. Cl.
*B60H 1/34* (2006.01)
*B64D 13/06* (2006.01)
(Continued)

(52) U.S. Cl.
CPC ............. *B60H 1/3407* (2013.01); *B63G 8/36* (2013.01); *B64D 13/00* (2013.01); *B64D 13/06* (2013.01); *B64G 1/48* (2013.01); *B64D 2013/003* (2013.01)

(58) Field of Classification Search
CPC .......... B60H 1/3407; B60H 1/34; B63G 8/36; B64D 13/00; B64D 13/06;
(Continued)

(56) References Cited

U.S. PATENT DOCUMENTS 2,991,706 A * 7/1961 Best ................. B64D 13/00
454/71
4,334,411 A * 6/1982 Payne ............... B64D 13/06
62/172
(Continued)

FOREIGN PATENT DOCUMENTS

CN 111284298 A * 6/2020
JP 2004268617 A * 9/2004
WO WO-2019216069 A1 * 11/2019 ........... B60H 1/3407

OTHER PUBLICATIONS

ESDU 85032—Ejectors and Jet Pumps Design and Performance for Incompressible Liquid Flow 2007.
(Continued)

*Primary Examiner* — Edelmira Bosques
*Assistant Examiner* — Frances F. Hamilton
(74) *Attorney, Agent, or Firm* — Parsons Behle & Latimer

(57) ABSTRACT

A passenger cabin air distribution system includes a ventilation system and an ejector-diffuser. The ventilation system is operable to provide a conditioned air. The ejector-diffuser is positioned to receive a flow of the conditioned air from the ventilation system. The ejector-diffuser includes an induction unit and a diffuser section. The induction unit includes a secondary inlet in communication with a cabin air from a passenger cabin and is configured to mix the flow of the conditioned air with an induced flow of the cabin air into a mixed air. The diffuser section includes a discharge to eject the mixed air to the passenger cabin. The diffuser section is shaped to provide for efficient mixing with low backpressure in order to maintain the low motive pressure in the nozzle.

20 Claims, 3 Drawing Sheets

(51) Int. Cl.
  *B64G 1/48* (2006.01)
  *B63G 8/36* (2006.01)
  *B64D 13/00* (2006.01)

(58) Field of Classification Search
  CPC ...... B64D 2013/003; B64G 1/48; B64G 1/50; F05B 2260/601; Y10T 137/5386; F24F 2110/10; F24F 2110/20; F24F 13/06; F24F 13/08
  USPC .......................................................... 454/76
  See application file for complete search history.

(56) References Cited

U.S. PATENT DOCUMENTS

| | | | |
|---|---|---|---|
| 6,024,639 A * | 2/2000 | Scherer | B64D 13/00 454/77 |
| 6,413,159 B1 | 7/2002 | Bates, III | |
| 8,099,973 B2 * | 1/2012 | Sampson | B64D 13/06 62/401 |
| 9,511,868 B2 * | 12/2016 | Stengel | B64D 13/00 |
| 2009/0163131 A1 * | 6/2009 | Walkinshaw | B64D 13/00 55/385.3 |
| 2009/0311951 A1 * | 12/2009 | Walkinshaw | F24F 13/26 96/60 |
| 2018/0057172 A1 * | 3/2018 | Sautron | F02C 3/04 |
| 2019/0023426 A1 | 1/2019 | Gray et al. | |
| 2019/0023427 A1 | 1/2019 | Fuller et al. | |
| 2019/0023428 A1 | 1/2019 | Veselka et al. | |
| 2021/0046806 A1 * | 2/2021 | Komatsubara | B60H 3/022 |

OTHER PUBLICATIONS

SAE AIR1191—Performance of Low Pressure Ratio Ejectors for Engine Nacelle Cooling 1999.

* cited by examiner

PASSENGER CABIN AIR DISTRIBUTION SYSTEM AND METHOD OF USING

STATEMENT OF GOVERNMENT RIGHTS

The invention described herein was made in the performance of work under NASA Contract No. NNK14MA75C and is subject to the provisions of Section 305 of the National Aeronautics and Space Act of 1958 (72 Stat. 435: 42 U.S.C. 2457).

FIELD OF THE DISCLOSURE

This disclosure relates generally to air distribution, and in particular to an air ejector-diffuser for use in a spacecraft.

BACKGROUND

Advances are continually being made in the area of human space flight and there is increased interest in further space exploration. Due to limited resources available in space, new technologies and techniques are needed to economize resources and reduce the size of components that are used within a spacecraft and lowering the costs associated with space travel. Some spacecraft may rely upon fans to pass air throughout a passenger compartment. Existing systems consume more fan energy to accomplish required ventilation. Other systems include multiple ducted cabin air intakes and multiple air distribution discharge points. These systems may have a greater mass, may be more complex, and/or may be more costly. In addition, these systems may include an orifice plate to provide restriction to allow proper airflow to an avionics branch.

FIG. 4 shows a cross-sectional view of a known ejector-diffuser 400. The ejector-diffuser 400 includes a motive fluid nozzle 410, a converging inlet cone 440, a diffuser throat 445, and a diverging outlet cone 465. The motive fluid nozzle 410 is supplied with a motive fluid 411 having a high pressure. The motive fluid 411 is used to induce a low-pressure inlet fluid 451 that is received through a side opening 450. The motive fluid 411 is mixed with the low-pressure inlet fluid 451 and discharged at a higher pressure than the pressure of the low-pressure inlet fluid 451. On an upstream side of the motive fluid nozzle 410, there is a high pressure and a low velocity. The motive fluid nozzle 410 creates an injected flow at a higher velocity and lower pressure. The motive fluid 411 expands to a pressure below a pressure of the low-pressure inlet fluid 451, which is drawn by the pressure differential through side opening 450 and combined with the motive fluid 411. The injected flow is directed towards the converging inlet cone 440, which further increases velocity and lowers pressure. The velocity of the injected flow is imparted to surrounding fluid and further entrains a flow of the low-pressure inlet fluid 451. The motive fluid 411 mixes with the low-pressure inlet fluid 451 through the converging inlet cone 440 and the diffuser throat 445 to create a mixed flow. The mixed flow passes through the diverging outlet cone 465, which slows the mixture down and increases its pressure to a mixture 460 having a pressure greater than the pressure of the low-pressure inlet fluid 451.

Known ejector-diffusers are limited by their need for a high-pressure motive fluid and their use of circular converging and diverging sections. Furthermore, known ejector-diffusers may include a pressure ratio of the pressure of the nozzle inlet fluid (motive fluid 411) to the pressure of the discharged mixture of 3:1 or greater. Additional disadvantages may exist.

SUMMARY

Disclosed are systems and methods that mitigate or resolve at least one of the disadvantages described above. In an embodiment, a passenger cabin air distribution system includes a ventilation system and an ejector-diffuser. The ventilation system is operable to provide a conditioned air. The ejector-diffuser is positioned to receive a flow of the conditioned air from the ventilation system. The ejector-diffuser includes an induction unit and a diffuser section. The induction unit includes a secondary inlet in communication with a cabin air from a passenger cabin and is configured to mix the flow of the conditioned air with an induced flow of the cabin air into a mixed air. The diffuser section includes a discharge to eject the mixed air to the passenger cabin. The diffuser section is shaped to provide for efficient mixing with low backpressure in order to maintain the low motive pressure in the nozzle.

In some embodiments, an absolute pressure ratio of the motive air within the nozzle to the cabin air in the passenger cabin is approximately 1.002. In some embodiments, the ejector-diffuser includes a first end with a primary inlet coupled to the ventilation system to receive the conditioned air, a second end opposite the first end, and a nozzle positioned between the first end and the second end. The discharge is at the second end. The nozzle may form an initial chamber adjacent the first end and a mixing chamber adjacent the second end. The nozzle includes an opening operable to provide the flow of the conditioned air from the initial chamber to the mixing chamber at a higher velocity and locally reduce a static pressure. The mixing chamber is in communication with the diffuser section. The secondary inlet is positioned to provide the induced flow of the cabin air into the mixing chamber. The opening may be an elongated slot-shaped opening. The mixing chamber may not include a plurality of vanes.

In some embodiments, the discharge includes a plurality of slots. The plurality of slots may include a plurality of arcuate slots. In some embodiments, the passenger cabin air distribution system includes a sensor positioned within a flow path of the induced flow of the cabin air before being mixed with the flow of the conditioned air. The sensor may be selected from the group consisting of a temperature sensor, a humidity sensor, and a smoke detector. A smoke detector may be positioned within the flow path of the induced flow of the cabin air before being mixed with the flow of the conditioned air.

In some embodiments, the passenger cabin air distribution system may include an airflow outlet operable to receive a second flow of the conditioned air from the ventilation system and direct the conditioned air to an electronics system for cooling. In some embodiments, the passenger cabin is the passenger cabin of a vehicle. The vehicle may be selected from the group consisting of an automobile, a submersible, a rotorcraft, an airplane, and a spacecraft. The vehicle may be a spacecraft and the electronics system may be an avionics system.

In an embodiment, a passenger cabin air distribution system includes an ejector-diffuser with a discharge, a ventilation system operable to provide a conditioned air to the ejector-diffuser, and an induction unit. The induction unit includes a secondary inlet and a nozzle with an elongated slot-shaped opening. The elongated slot-shaped opening causes a local reduction in static pressure of a flow of the conditioned air from the ventilation system flowing through the elongated slot-shaped opening. An induced flow of a cabin air flows through the secondary inlet due the local reduction in static pressure and is mixed with the flow of the conditioned air to form a mixed air that is ejected through the discharge into a passenger cabin. The motive pressure in the nozzle is approximately 1.002 atm. In some embodiments, a size and a shape of the elongated slot-shaped opening is selected to maximize mixing of air from the ventilation system and the induced flow of the cabin air.

In an embodiment, a method of distributing air in a passenger cabin includes providing a conditioned air from a ventilation system, locally reducing a static pressure to induce a flow of a cabin air, mixing the flow of the conditioned air and the flow of the cabin air into a mixed air, and ejecting the mixed air into the passenger cabin. A flow of the conditioned air is provided to an ejector-diffuser having a nozzle with an opening. The method includes directing the flow of the conditioned air through the nozzle opening and locally reducing a static pressure within a high-velocity region of the ejector-diffuser. The locally reducing the static pressure induces a flow of a cabin air from a passenger cabin through a secondary inlet in the ejector-diffuser.

In some embodiments, an absolute pressure ratio of the motive air within the nozzle to the cabin air in the passenger cabin is approximately 1.002. In some embodiments, the opening is an elongated slot-shaped opening. In some embodiments, the method includes positioning a sensor within a flow path of the flow of the cabin air before it is mixed with the flow of the conditioned air. In some embodiments, the passenger cabin is a passenger cabin of a spacecraft and the method includes providing a second flow of the conditioned air from the ventilation system to an airflow outlet. The airflow outlet directs the conditioned air to an avionics system of the spacecraft for cooling.

Figure 1:
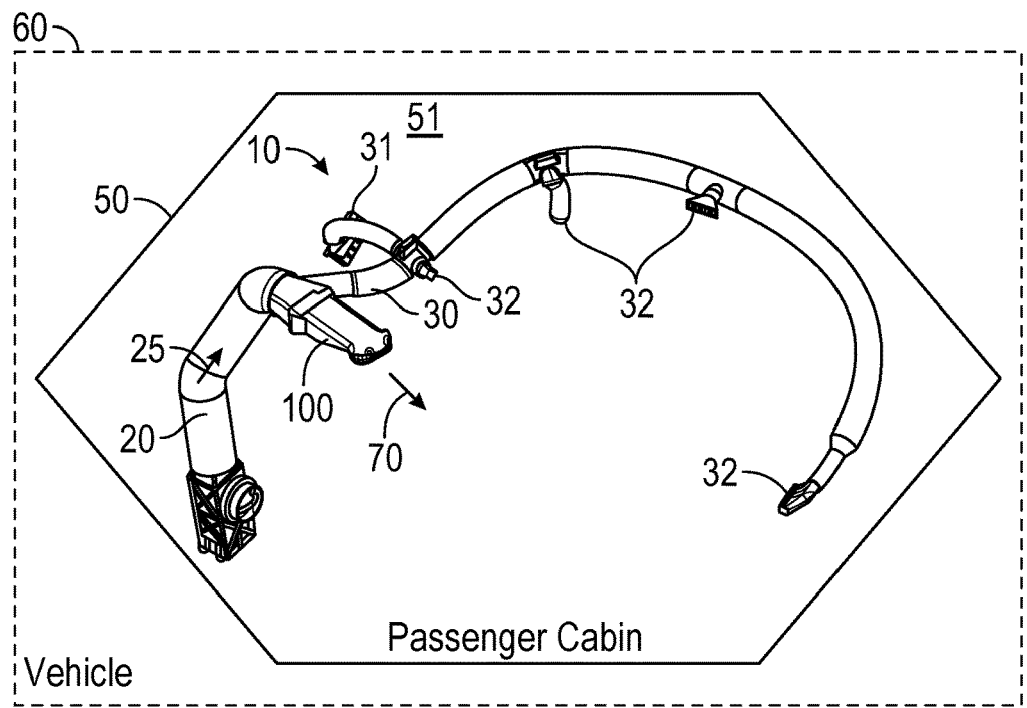
FIG. 1 is a diagram depicting an embodiment of a portion of a vehicle, such as a spacecraft, that includes a passenger cabin air distribution system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, an embodiment of a portion of a vehicle 60 with a passenger cabin air distribution system 10 is depicted. The vehicle 60 may be an automobile, a submersible, a rotorcraft, an airplane, or a spacecraft. The passenger cabin air distribution system 10 includes a ventilation system 20 that provides conditioned air 25. The passenger cabin air distribution system 10 includes an ejector-diffuser 100 that receives the conditioned air 25 from the ventilation system 20, mixes the conditioned air 25 with cabin air 51 from a passenger cabin 50, and ejects the mixed air 70 into the passenger cabin 50. The passenger cabin air distribution system 10 may include an airflow outlet 30 that provides a portion of the conditioned air for purposes other than supplying air to the passenger cabin 50 of the vehicle 60. The airflow outlet 30 may be an electronics duct to supply air to cool an electronics system of the vehicle 60. In one example, the electronics duct may be an avionics duct and the electronics system may be an avionics system. In another example, the vehicle is a spacecraft and the electronics system is an avionics system. The airflow outlet 30 may include one or more window vents 31, such as a plurality of window vents 31, and/or one or more avionics air supplies 32, such as a plurality of avionics air supplies 32.

Figure 2:
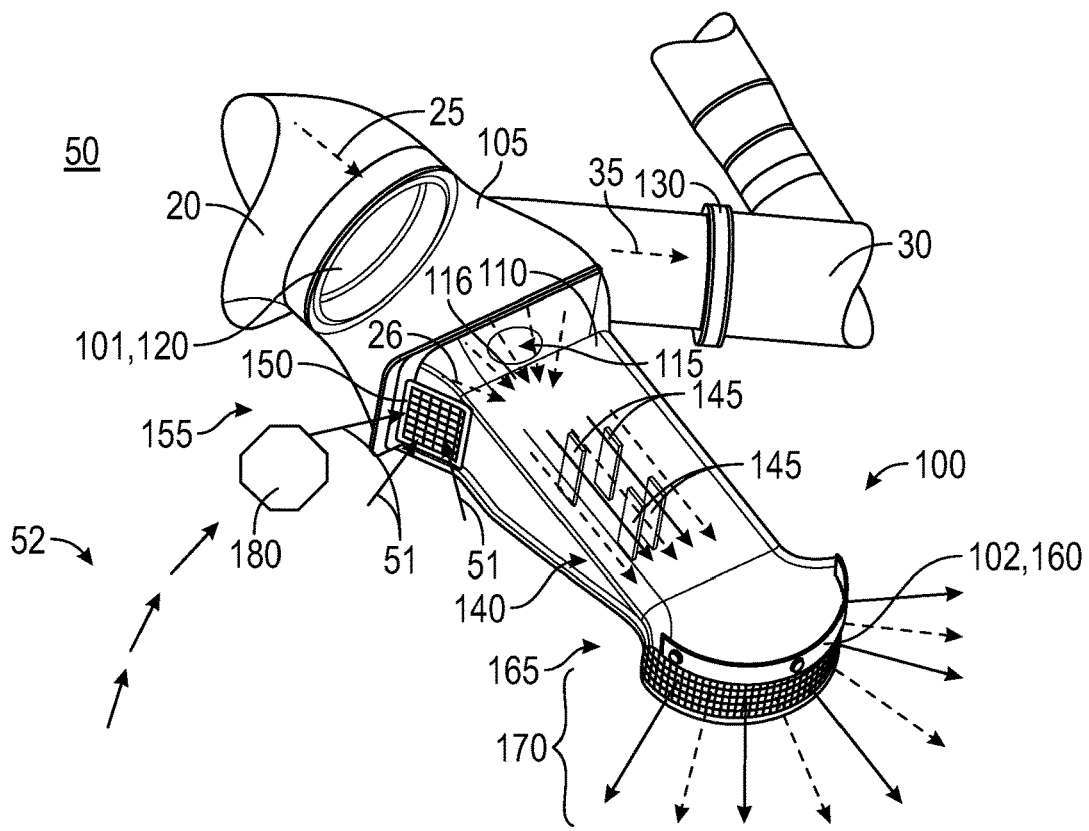
FIG. 2 shows an embodiment of an air ejector-diffuser.

Referring to FIG. 2, an embodiment of an ejector-diffuser 100 is shown. The ventilation system 20 provides a first flow 26 of conditioned air 25 to the ejector-diffuser 100 and a second flow 35 of conditioned air 25 to an airflow branch 130 that leads to the airflow outlet 30. The ejector-diffuser 100 includes an induction unit 155 and a diffuser section 165. The induction unit 155 includes a secondary inlet 150 that is in communication with the cabin air 51 in the passenger cabin 50. The induction unit 155 draws cabin air 51 into the ejector-diffuser 100 through the secondary inlet 150 as an induced flow where it is mixed with the first flow 26 of conditioned air 25 due to the shape and configuration of a mixing chamber 140 of the ejector-diffuser 100. The mixing chamber 140 is in communication with the discharge 160 (e.g. the discharge port) of the diffuser section 165. The mixing chamber 140 may have a rectangular cross-section extending from the opening 115 to the diffuser section 165. The mixing chamber 140 may have a uniform cross-section extending from the opening 115 to the diffuser section 165. The mixing of the first flow 26 of conditioned air 25 and the induced flow of cabin air 51 form a mixed air 170. The conditioned air 25 in the nozzle 110 has a low motive pressure. As used herein, the term "low motive pressure" means having a pressure such that an absolute pressure ratio of the conditioned air 25 in the nozzle 110 to the cabin air 51 in the passenger cabin 50 is less than 3:1, such as 1.5:1 or less. The cabin air 51 in the passenger cabin 50 may be atmospheric pressure. The motive pressure may be approximately 1.002 atm (atmospheres—atmospheric pressure). In this manner, an absolute pressure ratio of the conditioned air 25 within the nozzle 110 to the cabin air 51 in the passenger cabin 50 is approximately 1.002. The motive pressure is slightly above the cabin air 51 pressure to provide a pressure gradient that moves conditioned air 25 through the ejector-diffuser 100 into the passenger cabin 50. The motive pressure may range between 1.001 atm to 1.070 atm. The diffuser section 165 includes a discharge 160 to eject the mixed air 170 into the passenger cabin 50 (shown in FIG. 1).

The ejector-diffuser 100 includes a first end 101, a second end 102 opposite the first end 101, a primary inlet 120 positioned at the first end 101 and coupled to receive the first flow 26 of conditioned air 25, and a nozzle 110 positioned between the first end 101 and the second end 102. The discharge 160 is positioned at the second end 102. The nozzle 110 forms an initial chamber 105 adjacent to (e.g. near) the first end 101 and the mixing chamber 140 adjacent to the second end 102. The conditioned air 25 is restricted by the nozzle 110 to provide flow to the airflow outlet 30 through the airflow branch 130. The nozzle 110 includes an opening 115 to communicate the first flow 26 of conditioned air 25 from the initial chamber 105 to the mixing chamber 140. As the conditioned air 25 passes through the nozzle 110, it enters the mixing chamber 140 at a higher velocity and locally reduces a static pressure within a high-velocity region 116. The opening 115 may be circular. The local reduction in pressure induces the flow of cabin air 51 through the secondary inlet 150, which is mixed with the first flow 26 of conditioned air 25 within the mixing chamber 140. The mixing chamber 140 may include vanes 145 to increase the extent of mixing.

As cabin air 51 is drawn through the secondary inlet 150, the cabin air 51 travels along an induced flow path 52 within the passenger cabin 50. A sensor 180 may be positioned within the induced flow path 52 to detect a condition of the cabin air 51 before it is mixed with the conditioned air 25. The sensor 180 may be positioned external to the ejector-diffuser 100 and in the passenger cabin 50. A benefit of such positioning may allow more accurate diagnostics of air quality. Other benefits may exist. In some embodiments, sensor 180 may be positioned internal to the ejector-diffuser 100, such as within secondary inlet 150. In some embodiments, the sensor 180 may be a temperature sensor for detecting a temperature of the cabin air 51. In some embodiments, the sensor 180 may be a humidity sensor for detecting a humidity of the cabin air 51. In some embodiments, the sensor 180 may be a smoke detector for detecting smoke within the cabin air 51.

Figure 3:
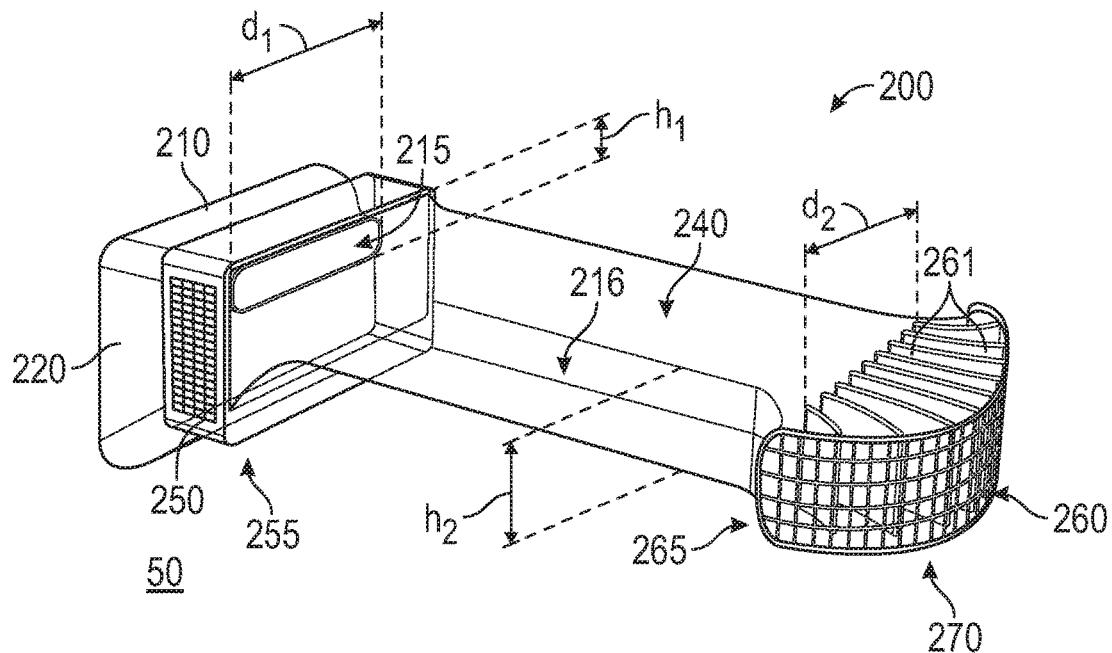
FIG. 3 shows an embodiment of an air ejector-diffuser.

FIG. 3 is an embodiment of the ejector-diffuser 100 shown in FIG. 2. Referring to both FIG. 1 and FIG. 2, conditioned air 25 passes through the opening 115 of the nozzle 110 and creates a high-velocity region 116 that draws the cabin air 51 in through the secondary inlet 150. The cabin air 51 and the conditioned air 25 are mixed in the mixing chamber 140 with the assistance of vanes 145. The mixed air 170 is passed to the discharge 160 and ejected to the passenger cabin 50. The discharge 160 may include a plurality of slots shaped to direct airflow into the passenger cabin 50. The plurality of slots may include a plurality of arcuate slots to further distribute the airflow into the passenger cabin 50. A benefit of arcuate slots may allow for a more uniform distribution of airflow into the passenger cabin 50.

Referring to FIG. 3, an embodiment of an ejector-diffuser 200 is shown. The ejector-diffuser 200 may be used in place of the ejector-diffuser 100 shown in FIG. 1 or the ejector-diffuser 100 shown in FIG. 2. The ejector-diffuser 200 includes a primary inlet 220 coupled to the ventilation system 20 (shown in FIG. 1) to receive the first flow 26 of conditioned air 25, a nozzle 210, an induction unit 255 and a diffuser section 265. The induction unit 255 includes a secondary inlet 250 that is in communication with the cabin air 51 in the passenger cabin 50 (shown in FIG. 1). The induction unit 255 draws cabin air 51 into the ejector-diffuser 200 through the secondary inlet 250 as an induced flow where it is mixed with the first flow 26 of conditioned air 25 due to the shape and configuration of a mixing chamber 240 of the ejector-diffuser 200. The mixing chamber 240 does not include a plurality of vanes 145, as shown in ejector-diffuser 100 in FIG. 2. The benefit of removing the plurality of vanes 145 may be a reduction in the sound level during operation. The mixing chamber 240 is in communication with the discharge 260 of the diffuser section 265.

The mixing of the first flow 26 of conditioned air 25 and the induced flow of cabin air 51 form a mixed air 270 (shown in FIG. 3). The diffuser section 265 includes a discharge 260 to eject the mixed air 270 into the passenger cabin 50 (shown in FIG. 1).

The nozzle 210 includes an elongated slot-shaped opening 215 to communicate the first flow 26 of conditioned air 25 (shown in FIG. 1) into the mixing chamber 240. The elongated slot-shaped opening 215 has a width $d_1$ greater than a height $h_1$. The width $d_1$ of the elongated slot-shaped opening 215 may be substantially equal to a width $d_2$ of the mixing chamber 240. The height $h_1$ of the elongated slot-shaped opening 215 may be less than a height $h_2$ of the mixing chamber 240. As used herein, the term "substantially" means at least almost entirely. In quantitative terms, "substantially" means at least 80% of a stated reference (e.g., quantity or shape). The size and shape of the elongated slot-shaped opening 215 may be selected to maximize mixing of the conditioned air 25 from the ventilation system 20 and the induced flow of the cabin air 51. The mixing chamber 240 may have a rectangular cross-section extending from the elongated slot-shaped opening 215 to the diffuser section 265. The mixing chamber 240 may have a uniform cross-section extending from the elongated slot-shaped opening 215 to the diffuser section 265.

Figure 5:
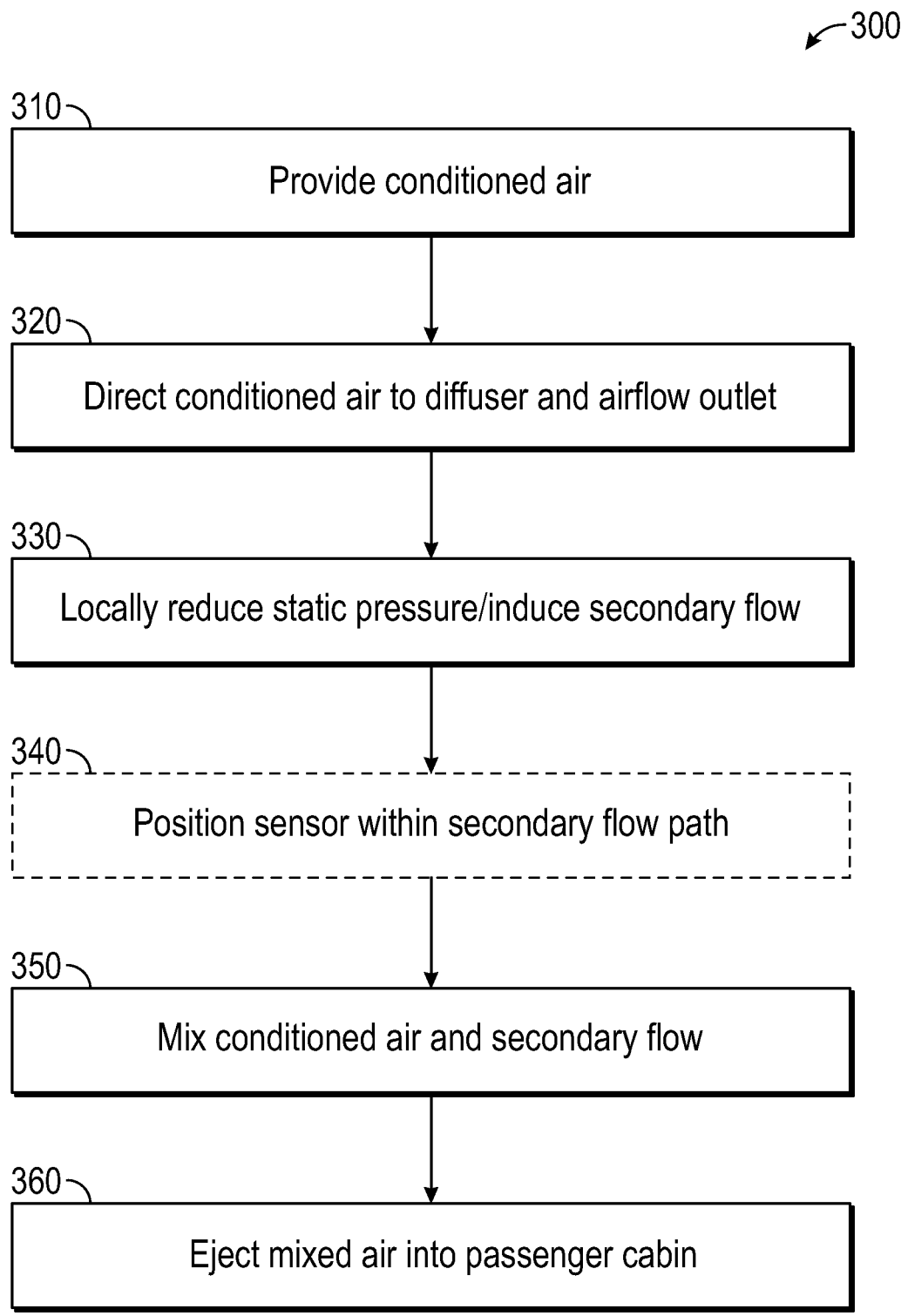
FIG. 5 is a flow diagram of an embodiment of a method for air distribution.

FIG. 5 is an embodiment of an airflow diagram of the ejector-diffuser 200 shown in FIG. 3. Referring to both FIGS. 1 and 2, as the conditioned air 25 passes through the nozzle 210, it enters the mixing chamber 240 at a higher velocity and locally reduces a static pressure within a high-velocity region 216. The local reduction in pressure induces the flow of cabin air 51 through the secondary inlet 250, which is mixed with the first flow 26 of conditioned air 25 within the mixing chamber 240. The mixed air 270 is passed to the discharge 260 and ejected to the passenger cabin 50. The discharge 260 may include a plurality of slots 261 shaped to direct airflow into the passenger cabin 50. The plurality of slots 261 may include a plurality of arcuate slots to further to direct airflow into the passenger cabin 50. A benefit of arcuate slots may allow for a more uniform distribution of airflow into the passenger cabin 50.

Figure 4:
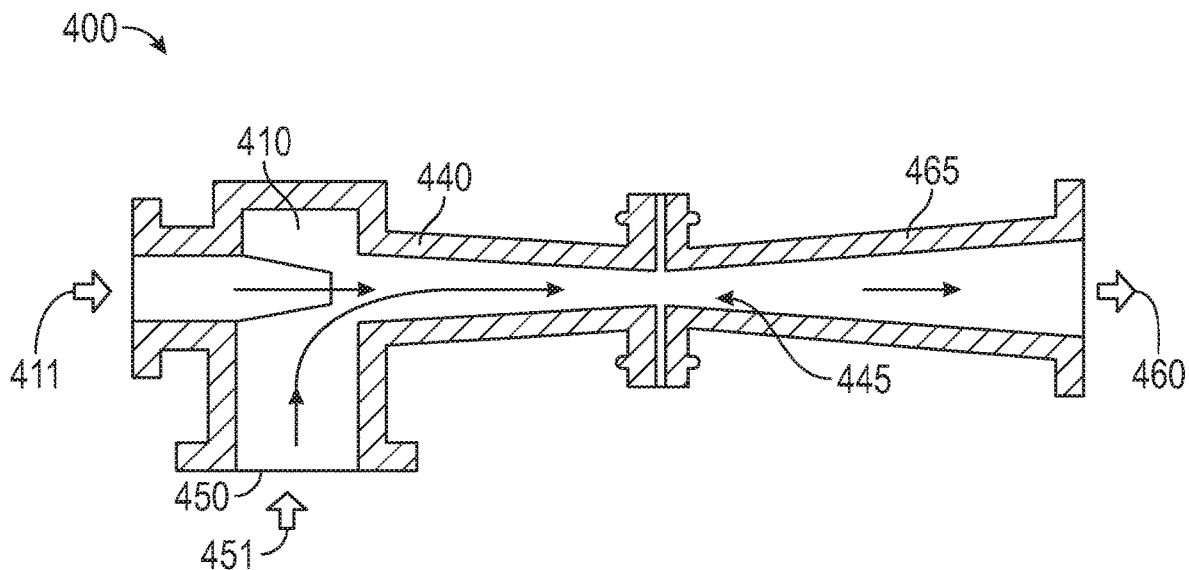
FIG. 4 shows an embodiment of a prior air ejector-diffuser.

The benefit of the elongated slot-shaped opening 215 may be increased efficiency, increased mixing, increased induced flow, and a more uniform airflow velocity at the discharge 260. The ventilation system 20 may supply the conditioned air 25 at a lower motive pressure than is used for known ejector-diffusers 400 (shown in FIG. 4) while still providing induced flow.

Referring to FIG. 5, an embodiment of a method 300 of distributing air in a passenger cabin is shown. The method 300 includes providing conditioned air, at 310. For example, conditioned air 25 may be provided from a ventilation system 20. The method 300 includes directing conditioned air to a diffuser and an airflow outlet, at 320. For example, a flow of conditioned air 25 is directed to an ejector-diffuser 100, 200. Another flow of conditioned air 35 may be directed to an airflow outlet 30. The method 300 includes locally reducing a static pressure and inducing a secondary flow, at 330. For example, a static pressure is locally reduced within a region of the ejector-diffuser 100, 200 by directing the first flow of the conditioned air 25 through an opening in a nozzle of the ejector-diffuser 100, 200. The local reduction in static pressure induces a secondary flow of cabin air 51 from a passenger cabin 50 through a secondary inlet in the ejector-diffuser 100, 200. The method 300 may include positioning a sensor 180 within the secondary flow path of the cabin air 51 to evaluate air quality, at 340. The method 300 includes mixing the conditioned air 25 with the secondary flow of cabin air 51 to form a mixed air, at 350. The method 300 includes ejecting the mixed air into the passenger cabin 50, at 360.

In contrast to known systems, air is supplied to the ejector-diffuser 100, 200 and the airflow outlet 30 with different pressure loss requirements. Air that would otherwise have been restricted using an orifice plate, in order to provide flow to the airflow outlet 30, is utilized to provide increased airflow to the passenger cabin 50 through the ejector-diffuser 100, 200. The ejector-diffuser 100, 200 is driven using existing pressure differences among the ventilation system 20 between the relatively higher-pressure loss avionics system and the ejector-diffuser 100, 200, which has a relatively lower pressure loss. The ejector-diffuser 100, 200 induces the flow of cabin air 51 and mixes to provide a higher volumetric flow out of the ejector-diffuser 100, 200. The mixing chamber of the ejector-diffuser 100, 200 is designed to improve secondary flow at lower motive pressures.

For example, known ejector-diffusers 400 (shown in FIG. 4) may utilize a motive fluid 411 with a high pressure and result in a ratio of the pressure of the discharged mixture to the low-pressure inlet fluid 451 of 3:1 or greater. In contrast, the disclosed ejector-diffusers 100, 200 may utilize a relatively lower-pressure conditioned air 25 from the ventilation system 20 as the motive fluid. In tests it was found that a motive pressure of approximately 1.002 atm (14.696 psi (1 atm)+0.036 psi (0.002 atm)) was achieved with a sufficiently high airflow rate. Here we understand 1 atm=14.696 psi and 14.696 psi+0.036 psi=14.732 psi. Therefore, 14.732 psi/14.696 psi=1.002 atm, and 14.732 psi*6.8948 kPa=101.57 kPa.

Although various embodiments have been shown and described, the present disclosure is not so limited and will be understood to include all such modifications and variations as would be apparent to one skilled in the art.

What is claimed is:

1. A passenger cabin air distribution system comprising:
    a ventilation system operable to provide a conditioned air;
    an ejector-diffuser having a nozzle positioned to receive a first flow of the conditioned air from the ventilation system, the ejector-diffuser including an induction unit and a diffuser section, the induction unit including a secondary inlet in communication with a cabin air from a passenger cabin and configured to mix the first flow of the conditioned air with an induced flow of the cabin air into a mixed air, the diffuser section including a discharge to eject the mixed air to the passenger cabin, the first flow of the conditioned air within the nozzle having a low motive pressure;
    an airflow outlet positioned to receive a second flow of the conditioned air through an airflow branch;
    wherein the ejector-diffuser further comprises:
        a first end having a primary inlet coupled to the ventilation system to receive the conditioned air;
        a second end opposite the first end, the discharge at the second end;
        the nozzle positioned between the first end and the second end, the nozzle forming an initial chamber adjacent the first end and a mixing chamber adjacent the second end, the nozzle including an opening operable to provide the first flow of the conditioned air from the initial chamber to the mixing chamber at a higher velocity and locally reduce a static pressure and wherein the first flow of the conditioned air is restricted by the nozzle to provide the second flow of the conditioned air to the airflow branch, the mixing chamber in communication with the diffuser section;
        the secondary inlet positioned to provide the induced flow of the cabin air into the mixing chamber;
    wherein the passenger cabin is the passenger cabin of a vehicle;
    wherein the airflow outlet directs the conditioned air to an electronics system for cooling; and
    wherein the vehicle is a spacecraft and the electronics system is an avionics system.

2. The passenger cabin air distribution system of claim 1, wherein an absolute pressure ratio of the conditioned air within the nozzle to the cabin air in the passenger cabin is approximately 1.002.

3. The passenger cabin air distribution system of claim 1, wherein the discharge includes a plurality of slots.

4. The passenger cabin air distribution system of claim 3, wherein the plurality of slots further comprise a plurality of arcuate slots.

5. The passenger cabin air distribution system of claim 1, wherein the opening is an elongated slot-shaped opening.

6. The passenger cabin air distribution system of claim 5, wherein the mixing chamber does not include a plurality of vanes.

7. The passenger cabin air distribution system of claim 5, wherein the elongated slot-shaped opening has a first width and a first height, the first width is greater than the first height.

8. The passenger cabin air distribution system of claim 1, further comprising a smoke detector positioned within a flow path of the induced flow of the cabin air before being mixed with the first flow of the conditioned air.

9. The passenger cabin air distribution system of claim 1, further comprising a sensor positioned within a flow path of the induced flow of the cabin air before being mixed with the first flow of the conditioned air.

10. The passenger cabin air distribution system of claim 9, wherein the sensor is selected from the group consisting of a temperature sensor and a humidity sensor.

11. The passenger cabin air distribution system of claim 9, wherein the sensor is positioned external to the ejector-diffuser.

12. The passenger cabin air distribution system of claim 11, further comprising:
    wherein the mixing chamber has a second width and a second height;
    wherein the first width is substantially equal to the second width; and
    wherein the first height is less than the second height.

13. A passenger cabin air distribution system comprising:
    an ejector-diffuser having a discharge;
    a ventilation system operable to provide a conditioned air to the ejector-diffuser;
    an induction unit comprising a secondary inlet and a nozzle with an elongated slot-shaped opening, the elongated slot-shaped opening causing a local reduction in static pressure of a flow of the conditioned air from the ventilation system flowing through the elongated slot-shaped opening, an induced flow of a cabin air flowing through the secondary inlet due the local reduction in static pressure, wherein the elongated slot-shaped opening has a first width and a first height, the first width is greater than the first height;
    wherein the flow of the conditioned air is mixed with the induced flow of the cabin air in a mixing chamber to form a mixed air that is ejected from the discharge into a passenger cabin, the conditioned air within the nozzle having a motive pressure of approximately 1.002 atm;
    wherein the mixing chamber has a second width and a second height;

wherein the first width is substantially equal to the second width; and wherein the first height is less than the second height.

14. The passenger cabin air distribution system of claim 13, wherein a size and a shape of the elongated slot-shaped opening is selected to maximize mixing of air from the ventilation system and the induced flow of the cabin air.

15. The passenger cabin air distribution system of claim 13, further comprising:

an airflow outlet operable to receive a second flow of the conditioned air from the ventilation system and direct the conditioned air to an electronics system for cooling; and wherein the passenger cabin is within a spacecraft and the electronics system is an avionics system.

16. A method of distributing air in a passenger cabin, the method comprising:

providing a conditioned air from a ventilation system, a flow of the conditioned air being provided to an ejector-diffuser, the ejector-diffuser having a nozzle with an opening;

locally reducing a static pressure within a high-velocity region of the ejector-diffuser by directing the flow of the conditioned air through the nozzle opening, the locally reducing the static pressure inducing a flow of a cabin air from a passenger cabin through a secondary inlet in the ejector-diffuser;

mixing the flow of the conditioned air and the flow of the cabin air into a mixed air; and ejecting the mixed air into the passenger cabin; and wherein an absolute pressure ratio of the conditioned air in the nozzle to the cabin air in the passenger cabin is approximately 1.002.

17. The method of claim 16, wherein the opening is an elongated slot-shaped opening.

18. The method of claim 16, wherein the passenger cabin is a passenger cabin of a spacecraft, and further comprising providing a second flow of the conditioned air from the ventilation system to an airflow outlet, the airflow outlet directing the conditioned air to an avionics system of the spacecraft for cooling.

19. The method of claim 16, further comprising positioning a sensor within a flow path of the flow of the cabin air before being mixed with the flow of the conditioned air.

20. The method of claim 19, further comprising positioning the sensor external to the ejector-diffuser.

* * * * *